United States Patent [19]

Ohuchi et al.

[11] Patent Number: 5,617,485
[45] Date of Patent: *Apr. 1, 1997

[54] IMAGE REGION SEGMENTATION SYSTEM

[75] Inventors: Satoshi Ohuchi, Hachioji; Kaoru Imao, Yokohama, both of Japan

[73] Assignee: Ricoh Company, Ltd., Tokyo, Japan

[*] Notice: The term of this patent shall not extend beyond the expiration date of Pat. No. 5,134,666.

[21] Appl. No.: 485,553

[22] Filed: Apr. 4, 1995

Related U.S. Application Data

[63] Continuation of Ser. No. 137,507, Oct. 18, 1993, abandoned, which is a continuation of Ser. No. 828,474, Jan. 30, 1992, abandoned, which is a continuation-in-part of Ser. No. 743,204, Aug. 9, 1991, Pat. No. 5,134,666.

[30] Foreign Application Priority Data

Feb. 4, 1991 [JP] Japan ................................. 3-035752

[51] Int. Cl.$^6$ ............................................. G06K 9/00
[52] U.S. Cl. .................... 382/176; 382/194; 358/462
[58] Field of Search ................................. 382/176, 205, 382/194; 358/462, 464

[56] References Cited

U.S. PATENT DOCUMENTS

| | | | |
|---|---|---|---|
| 4,503,556 | 3/1985 | Scherl et al. | 382/9 |
| 4,750,209 | 6/1988 | Shimura et al. | 382/9 |
| 4,953,013 | 8/1990 | Tsuji et al. | 358/462 |
| 5,025,481 | 6/1991 | Ohuchi | 382/9 |
| 5,134,666 | 7/1992 | Imao et al. | 382/9 |
| 5,148,495 | 9/1992 | Imao et al. | 382/9 |

OTHER PUBLICATIONS

Digital Image Processing, Gonzalez et al, 1977 pp. 333–350.
Nobuji Tetsutani et al, "Bilevel Rendition Method for Documents Including Gray–Scale and Bilevel Image," *Institute of Electronics and Communication Engineers of Japan* (*IECEJ*), 1984, vol. J67–B, No. 7, pp. 781–788.

*Primary Examiner*—Leo Boudreau
*Assistant Examiner*—Christopher S. Kelley
*Attorney, Agent, or Firm*—Woodcock Washburn Kurtz Mackiewicz & Norris

[57] ABSTRACT

An image region segmentation system includes a first detection part for detecting a candidate region for a text region within an image, a second detection part for detecting a white region within the image by carrying out a pattern matching of a matrix including a pixel of the image with predetermined matrix patterns for a set of successive white pixels, and a discrimination part for detecting whether or not the candidate region detected by the first detection part is a text region by checking if a white region is detected in a neighborhood of the detected candidate region.

10 Claims, 12 Drawing Sheets

FIG. 3
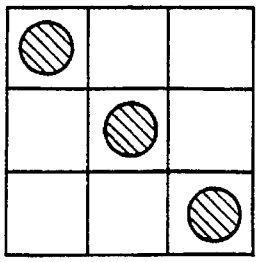
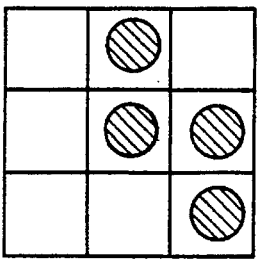
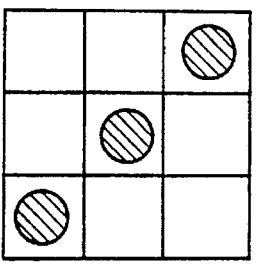
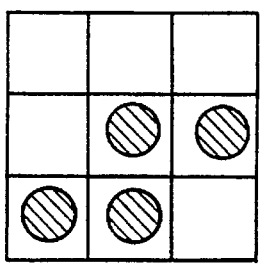
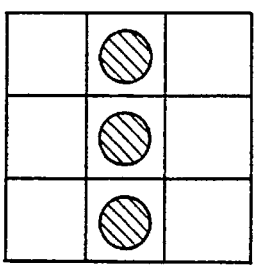
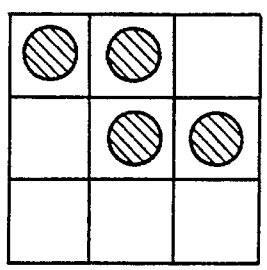
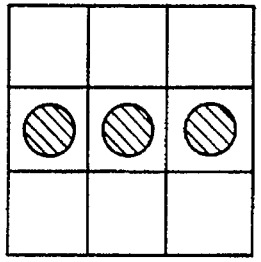
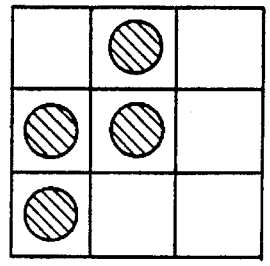
◯ : BLACK PIXEL

FIG. 4
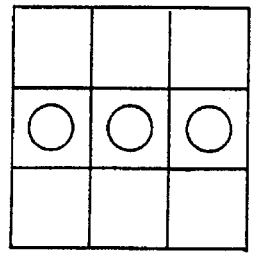
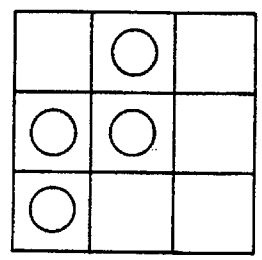
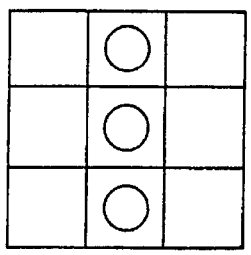
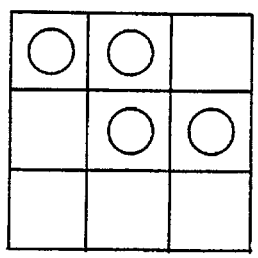
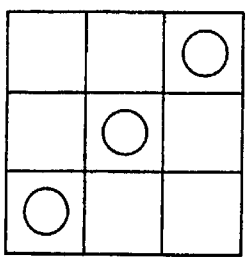
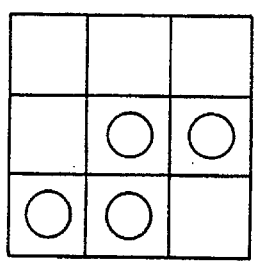
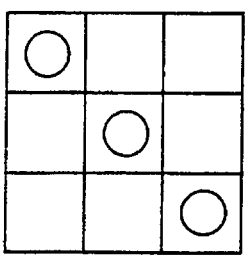
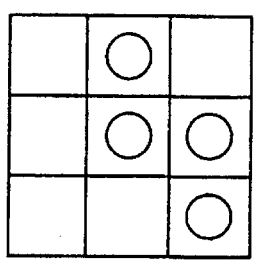
◯ : WHITE PIXEL FIG. 6
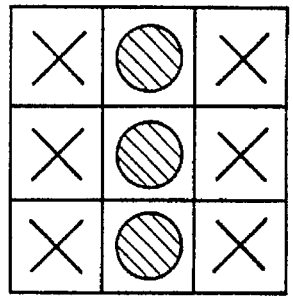
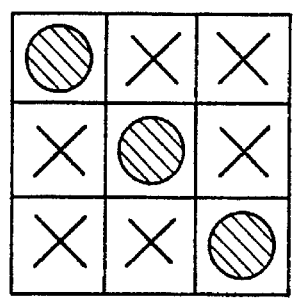
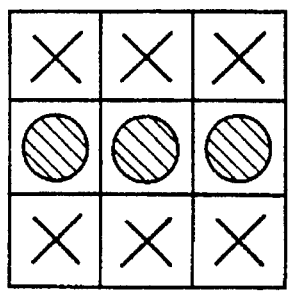
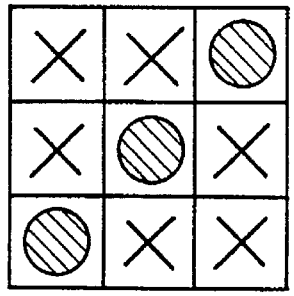
◯ : BLACK PIXEL
✕ : EITHER BLACK PIXEL OR WHITE PIXEL FIG.7
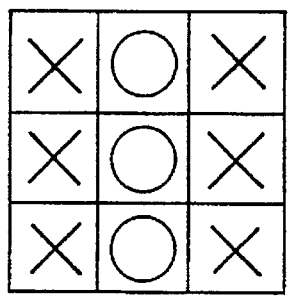
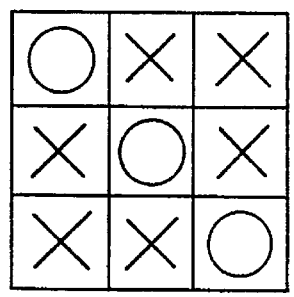
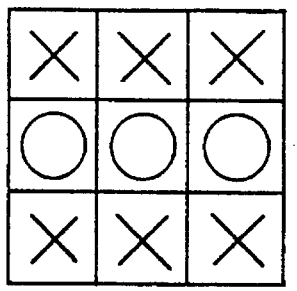
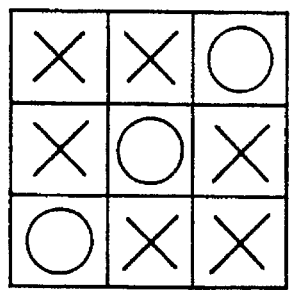
○ : WHITE PIXEL
× : EITHER BLACK PIXEL OR WHITE PIXEL

FIG.8
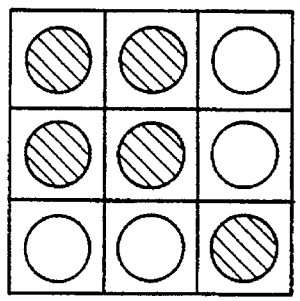
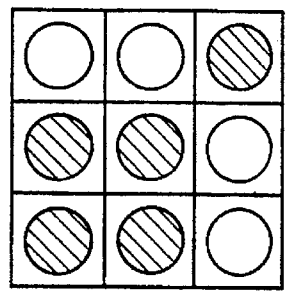
⊘ : BLACK PIXEL
○ : WHITE PIXEL
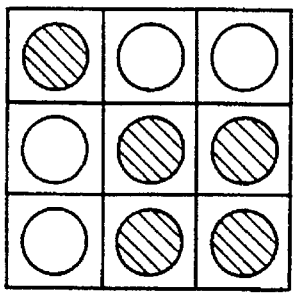
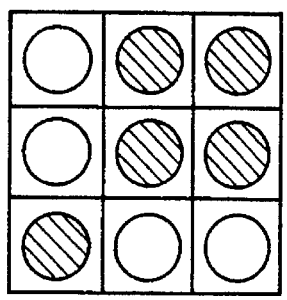

FIG.9
◯ : BLACK PIXEL
◯ : WHITE PIXEL
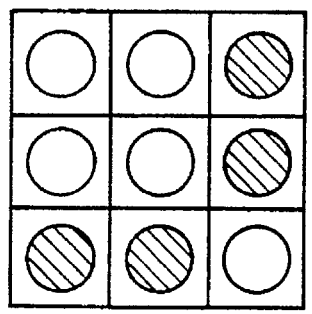
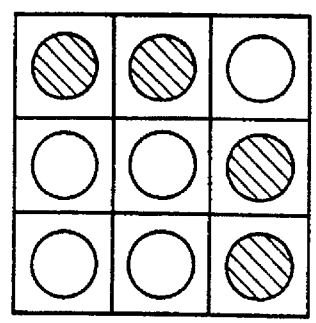
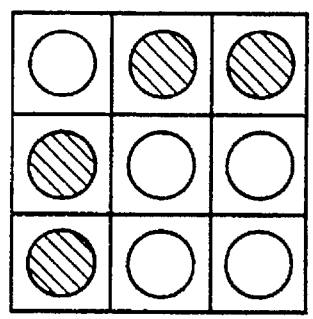
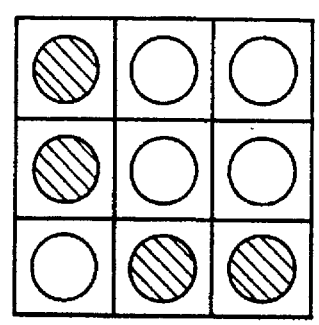

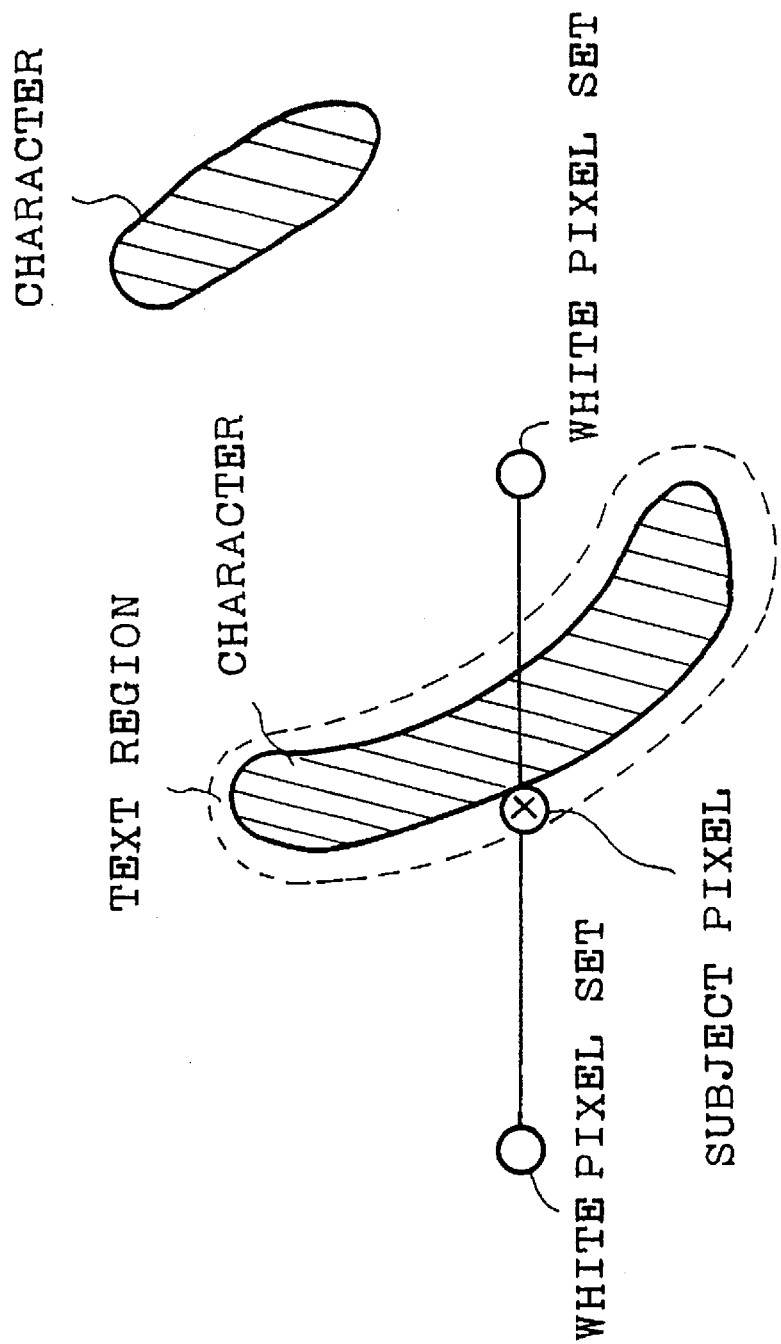

IMAGE REGION SEGMENTATION SYSTEM

This application is a continuation of U.S. patent application Ser. No. 08/137,507, filed Oct. 18, 1993, now abandoned; which was a continuation of U.S. patent application Ser. No. 07/828,474, filed Jan. 30, 1992, now abandoned; which was a continuation-in-part of U.S. patent application Ser. No. 07/743,204, filed Aug. 9, 1991, now U.S. Pat. No. 5,134,666.

BACKGROUND OF THE INVENTION

The present invention relates generally to an image region segmentation system, and more particularly to an image region segmentation system for automatically discriminating a text region from an image in which a line image and a dot image (which includes a continuous-tone dot image and/or a screened halftone dot image) coexist. This system is applicable to digital copying machines and facsimile machines.

In copying machines or facsimile machines, an image which is copied, transmitted or received may be a composite image in which a dot image and a line image coexists. The dot image refers to a photograph, a picture or the like which is described by dots, while the line image refers to a character, a text or the like which is described by lines. In order to improve the quality of the copied, transmitted or received image, it is desirable to carry out a pseudo-halftone generating process with respect to the continuous-tone dot region such as a photograph, to carry out a process of eliminating the moire with respect to the screened halftone dot region, and to carry out a sharpening process with respect to the line region such as a character. In addition, when transmitting the composite image, it is desirable from the point of view of improving the compression rate that a coding process is carried out after processes appropriate for characteristics of various regions of the image are carried out.

In order for carrying out the processes appropriate for characteristics of the various regions of the image, it is necessary to accurtely discriminate between a text region and a picture region within an image as a preliminary process before the above processes are carried out. Conventionally, there is a block adaptive thresholding method which has been used as a method for discriminating a line region from an original image, and this method is hereinafter referred to as the BAT method. This BAT method is disclosed, for example, in "Bilevel Rendition Method for Documents Including Gray-Scale and Bilevel Image" by N. Tetsutani et al. in an article from the the Institute of Electronics and Communication Engineers of Japan (IECEJ), (1984), Vol.J67-B, No.7, pp. 781–788. When the BAT method is applied to an image, the image is divided into a plurality of blocks each having a prescribed size, and the maximum intensity (or the maximum optical density) level and the minimum intensity (or the minimum optical density) level are detected for each of the blocks. If a block among the blocks has a difference between the maximum and minimum intensity levels that is greater than a predetermined threshold value, then it is judged that the block is a line region or a text region within the image. If a block has a difference between the maximum and the minimum intensity levels that is not greater than the threshold value, then it is judged that the block is a gray-scale image region or a picture region which is different from the text region within the image.

However, when the above described BAT method is applied, a screened halftone dot image cannot be discriminated from the original image, and there is a possibility that such a screened halftone dot image is erroneously judged as being a text region of the image. Therefore, in order to accurately discriminate a text region within the image when the BAT method is applied, it is necessary to carry out simultaneously an additional process of discriminating between a screened halftone dot image and a non-screened halftone dot image within the image. Thus, the composite BAT method in such a case becomes a complicated process, and the apparatus for accurately discriminating between a text region and a picture region within an image must have a relatively great, complicated hardware, when compared with the hardware of an apparatus for performing the simple BAT method only.

SUMMARY OF THE INVENTION

Accordingly, it is a general object of the present invention to provide an improved image region segmentation system in which the above described problems are eliminated.

Another and more specific object of the present invention is to provide an image region segmentation system which can accurately discriminate a text region from an image in which a line image such as a character and a dot image such as a dot photograph coexists, by making use of a simple and compact hardware. The above mentioned object of the present invention can be achieved by an image region segmentation system which includes a first detection part for detecting a candidate region for a text region within the image, a second detection part for detecting a white region within the image by carrying out a pattern matching of a matrix including a pixel of the image in the center of the matrix with predetermined matrix patterns for a set of successive white pixels, and a discrimination part for detecting whether or not the candidate region detected by the first detection part is a text region by checking if a white region is detected in a neighborhood of the detected candidate region within the image by the second detection part. According to the present invention, it is possible to accurately discriminate a text region from an image based on image signals being received, because the text region thus discriminated has to be a region which is detected as being a candidate region by the first detection part and a white region has to be detected in the neighborhood of the detected candidate region by the second detection part. In addition, the hardware of the system for automatically discriminating a text region from an image is simple and compact, when compared with that of a conventional segmentation system.

Other objects and further features of the present invention will be more apparent from the following detailed description when read in conjunction with the accompanying drawings.

BRIEF DESCRIPTION OF THE DRAWINGS

FIG. 3 is a diagram showing standard matrix patterns of black and non-black pixels for detecting a text region within an image;

FIG. 4 is a diagram showing standard matrix patterns of white and non-white pixels for detecting a text region within an image;

FIG. 6 is a diagram showing standard matrix patterns for detecting associated black pixels within an image;

FIG. 7 is a diagram showing standard matrix patterns for detecting associated white pixels within an image;

FIG. 8 is a diagram showing standard matrix patterns for detecting screened black pixels within an image;

FIG. 9 is a diagram showing standard matrix patterns for detecting screened white pixels within an image;

FIG. 14 is a diagram for explaining detection of a white region performed by a correction part of a white region detecting unit.

DESCRIPTION OF THE PREFERRED EMBODIMENTS

Figure 1:
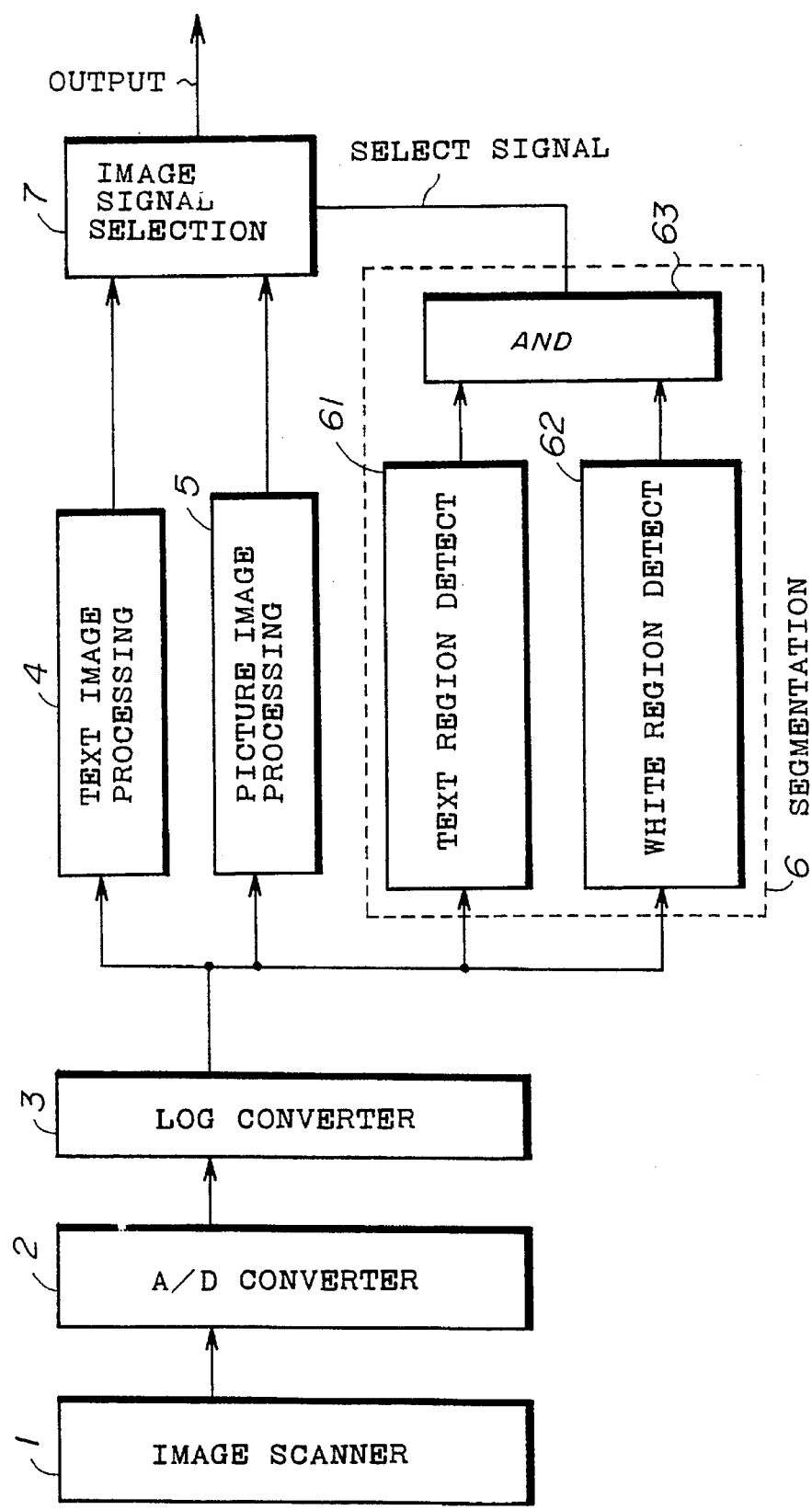
FIG. 1 is a block diagram showing a construction of an image reproducing system to which an image region segmentation system of the present invention is applied.

First, a description will be given of an image reproducing system such as a facsimile machine, to which an image region segmentation system of the present invention is applied, by referring to FIG. 1. In FIG. 1, an image scanner 1 having a photoelectric conversion element such as a charge-coupled device (CCD) scans a document so that an analog halftone signal is generated from the scanned document, and an A/D converter 2 converts each signal from the image scanner 1 into a digital signal. This digital signal is, for example, a 8-bit digital signal. A LOG converter 3 carries out an optical density conversion process on each signal received from the A/D converter 2. A text image processing part 4 emphasizes an edge of an image by carrying out a sharpening process of each received image signal, and carries out a bilevel rendition process of each received image signal so that a binary signal is generated from an image signal for which the sharpening process is carried out. A picture image processing part 5 performs a smoothing process of each received image signal, and carries out a halftone image rendition process of the image signal by applying an ordered dither method or an error diffusion method to the image signal for which the smoothing process is carried out.

A segmentation unit 6 in the image reproducing system shown in FIG. 1 includes a text region detecting unit 61, a white region detecting unit 62 and an AND part 63. The present invention is applied to this segmentation unit 6. The segmentation unit 6 detects whether or not an image region within an image is a text region and detects whether or not a white region exists in the neighborhood of a subject pixel of the detected text region, so that a signal for selecting either a text image signal or a picture image signal is produced based on the result of the detection by the segmentation unit 6. The image reproducing system shown in FIG. 1 includes an image signal selection part 7, and this image selection part 7 outputs selectively a binary signal of a text image from the text image processing part 4 or a signal of a picture image from the picture image processing part 5, in accordance with the select signal received from the segmentation unit 6. The ordered dither method, for example, is applied to the signal of the picture image from the picture image processing part 5.

Figure 2:
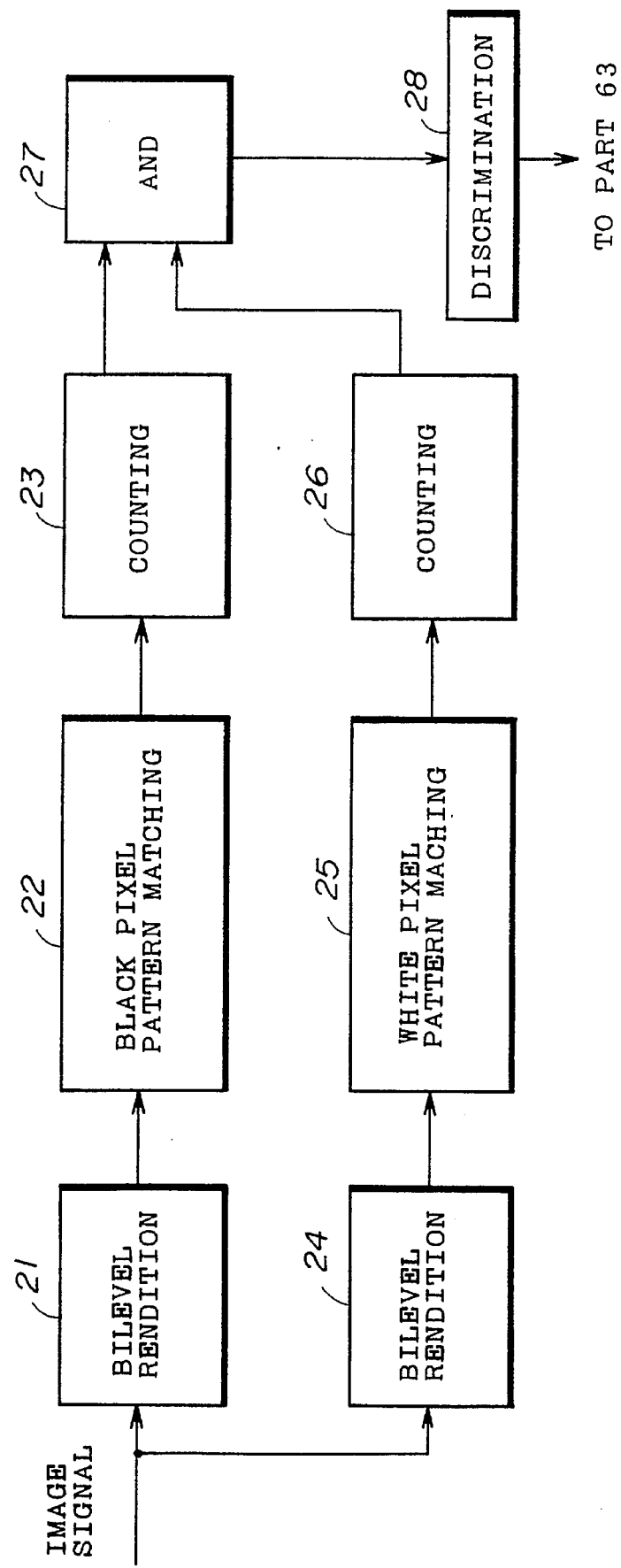
FIG. 2 is a block diagram showing a construction of a text region detecting unit.

As an apparatus for discriminating a text region within an image, there is an apparatus which is disclosed in Japanese Patent Application No.1-113242, assigned to the same assignee as that of the present invention. FIG. 2 shows a construction of an example of the text region detecting unit 61 which is essentially the same as that disclosed in the above mentioned patent application. The text region detecting unit 61 discriminates a text region from an image by making use of the feature of a character image that associated black pixels and associated white pixels both having a density level higher than a given level coexist in an outline of a character.

In FIG. 2, a bilevel rendition part 21 carries out a binarization of an image signal by comparing an intensity level of the signal with a predetermined low threshold level so that a binary signal indicating either a black pixel or a non-black pixel is generated by the bilevel rendition part 21 from the image signal. This binary signal indicates a black pixel if the signal has an intensity level higher than the low threshold level, while it indicates a non-black pixel if the signal has an intensity level not higher than the low threshold level. A black-pixel pattern matching part 22 carries out a pattern matching with respect to a binary signal received from the bilevel rendition part 21.

If a 3×3 matrix of pixels including a pixel of the received signal in the center of the matrix matches with one of eight standard patterns of black and non-black pixels shown in FIG. 3, the black pixel pattern matching part 22 detects a binary signal whose pixel forms a part of associated black pixels, and generates a signal indicating "one" with respect to each pixel of the received image signal. A counting part 23 increments the number of the received signals indicating "one" each time a signal indicating "one" is received from the pattern matching part 22. The number of the signals thus incremented shows the number of associated black pixels included in each 3×3 matrix pattern. If the number of the associated black pixels is greater than a given reference number (which may be equal to, for example, 2), the counting part 23 generates a signal indicating "one" with respect to each pixel of the received signal.

A bilevel rendition part 24 carries out a binarization of an image signal by comparing an intensity level of an image signal with a predetermined high threshold level so that a binary signal indicating either a white pixel or a non-white pixel is generated from the image signal. This binary signal indicates a white pixel if the image signal has a level higher than the high threshold level, while it indicates a non-white pixel if the image signal has a level not higher than the high threshold level. A white-pixel pattern matching part 25 carries out a pattern matching of a binary signal received from the bilevel rendition part 24.

Similarly, if a 3×3 matrix pattern including a pixel of the received binary signal in the center of the matrix matches with one of eight standard patterns of white and non-white pixels shown in FIG. 4, the white pixel pattern matching part 25 detects a binary signal whose pixel forms a part of associated white pixels, and generates a signal indicating "one" with respect to each pixel of the received signal. A counting part 26 increments the number of the received signals indicating "one" each time the signal indicating "one" is received from the pattern matching part 25. The number of the signals thus incremented shows the number of associated white pixels included in each 3×3 matrix pattern. If the number of the associated white pixels is greater than a given reference number (for example, 2), the counting part 26 generates a signal indicating "one" with respect to each pixel of the received signal.

An AND part 27 generates a signal indicating conjunction between the signal from the counting part 23 and the signal from the counting part 26 with respect to each pixel of the received signal. In other words, if two or more associated black pixels and two or more associated white pixels coexist within the 3×3 matrix including the pixel of the received signal in the center of the matrix, the AND part 27 generates a signal indicating "one". It is assumed that the pixel of the received signal in the center of the matrix is a candidate pixel which may form a part of a line image such as a character.

If the number of the candidate pixels in a 5×5 matrix including the pixel of the received signal in the center of the matrix is greater than a given reference number, a discrimination part 28 judges that a block with a prescribed size including the pixel (or, the 5×5 matrix region including the pixel) is a text region within an image, and generates a signal indicating "one" for each pixel of the received signal. The text region detecting unit 61 detects a candidate region for a text region within an image, but the present invention is not limited to the embodiment shown in FIG. 2.

Figure 5:
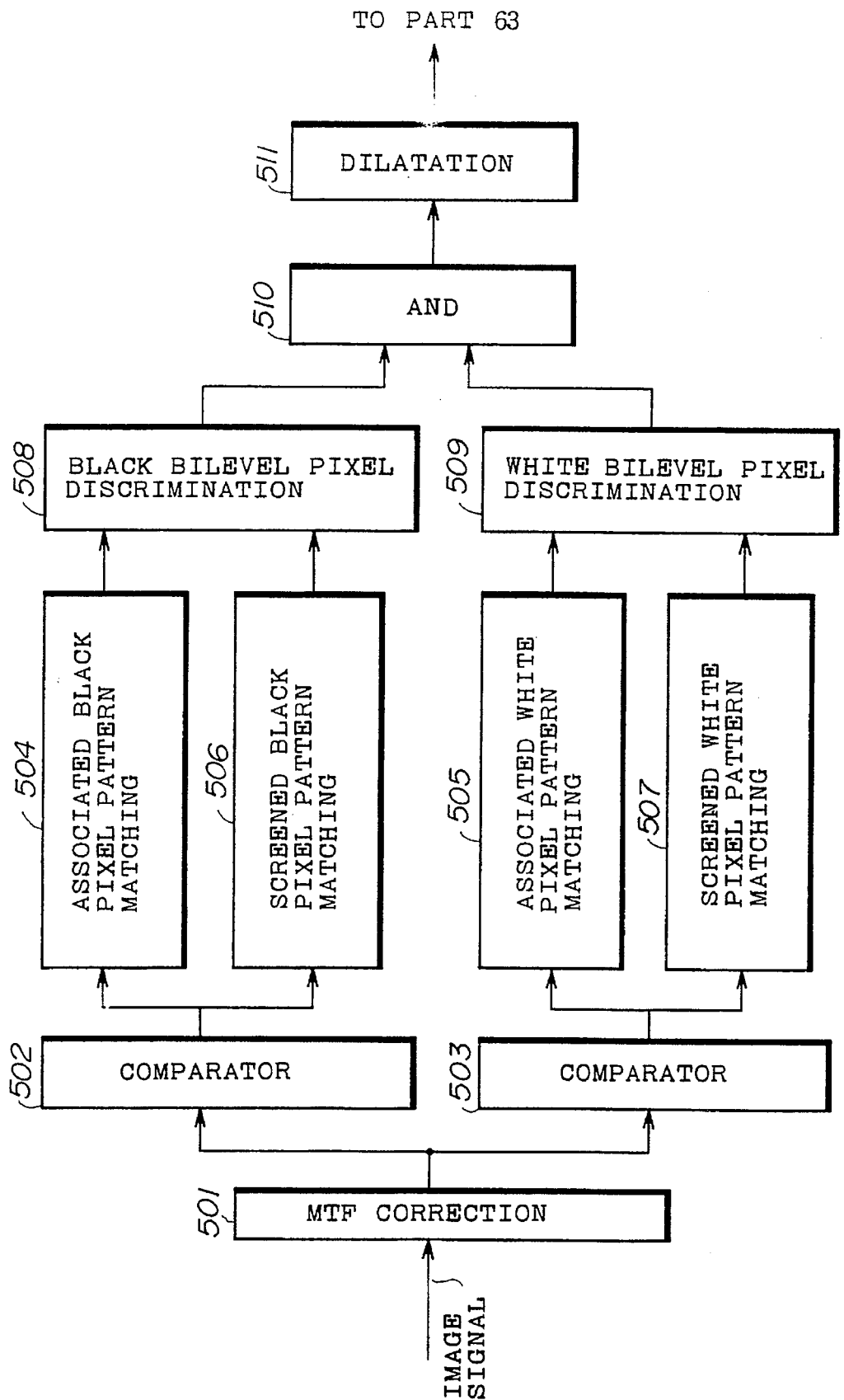
FIG. 5 is a block diagram showing a construction of another text region detecting unit.

There is another example of the text region detecting unit 61, which is disclosed, for example, in the copending United States application Ser. No. 700,421, now U.S. Pat. No. 5,148,495 assigned to the same assignee as that of the present invention. FIG. 5 shows another text region detecting unit which is essentially the same as that disclosed in the above mentioned patent application. This text region detecting unit detects a candidate region for a text region within an image, and the text region is discriminated from the image by detecting a screened halftone dot in the image.

In FIG. 5, a MTF (Modulation Transfer Function) correction part 501 carries out a sharpening process of an image signal by performing a filtering of the image signal. Comparators 502 and 503 convert the image signal into a three-level signal indicating one of black, gray and white pixels having discrete intensity levels.

An associated black pixel pattern matching part 504 receives a three-level signal indicating a black pixel from the comparator 502, and detects whether or not each pixel of the received signal is closely associated with other black pixels in the neighborhood of the pixel of the received signal. If a 3×3 matrix of pixels including the pixel of the received signal in the center of the matrix matches with one of four 3×3 standard matrix patterns shown in FIG. 6, the associated black pixel pattern matching part 504 detects that the pixel in the center of the matrix is an associated black pixel closely associated with other neighborhood pixels, and generates a detection signal which is activated for the pixel of the received image signal. The above procedure is repeated with respect to each of the black pixels of three-level signals received from the comparator 502. The standard matrix patterns shown in FIG. 6 are used for detecting an associated black pixel within an image, and in these matrix patterns a shaded circle denotes a black pixel and cross-out mark denotes either a black pixel or a white pixel. As shown in FIG. 6, the associated black pixels are aligned straight in any of up/down, right/left and inclined directions, which feature is utilized for the pattern matching of associated black pixels.

An associated white pixel pattern matching part 505 receives a three-level signal indicating a white pixel from the comparator 503, and detects whether or not each pixel of the received signal is closely associated with other white pixels in the neighborhood of the pixel of the received signal. If a 3×3 matrix of pixels including the pixel of the received signal in the center of the matrix matches with one of four four 3×3 standard matrix patterns shown in FIG. 7, the associated white pixel pattern matching part 505 detects that the pixel in the center of the matrix is an associated white pixel closely associated with other neighborhood pixels, and generates a detection signal which is activated for the pixel of the received image signal. The above procedure is repeated with respect to each of the white pixels of three-level signals received from the comparator 503. The standard matrix patterns shown in FIG. 7 are used for detecting an associated white pixel within an image, and in these matrix patterns, a blank circle denotes a white pixel and a cross-out mark denotes either a black pixel or a white pixel. As shown in FIG. 7, the associated white pixels are aligned straight in any of up/down, right/left and inclined directions, which feature is utilized for the pattern matching of associated white pixels.

A screened black pixel pattern matching part 506 detects whether or not each black pixel of the received signals received from the comparator 502 forms part of a screened halftone black dot image within an image. If a 3×3 matrix of pixels including the pixel of the received signal in the center of the matrix matches with one of four 3×3 standard matrix patterns shown in FIG. 8, the screened black pixel pattern matching part 506 detects that the pixel in the center of the matrix forms part of a screened halftone black dot image, and generates a detection signal which is activated for the pixel of the received image signal. The above procedure is repeated with respect to each of the black pixels of three-level signals received from the comparator 502. The standard matrix patterns shown in FIG. 8 are used for detecting a screened halftone black pixel within an image, and in these matrix patterns, a blank circle denotes a white pixel and a shaded circle denotes a black pixel.

A screened white pixel pattern matching part 507 detects whether or not each white pixel of the received signals received from the comparator 503 forms part of a screened halftone white dot image within an image. If a 3×3 matrix of pixels including the pixel of the received signal in the center of the matrix matches with one of four 3×3 standard matrix patterns shown in FIG. 9, the screened white pixel pattern matching part 507 detects that the pixel in the center of the matrix forms part of a screened halftone white dot image, and generates a detection signal which is activated for the pixel of the received image signal. The above procedure is repeated with respect to each of the white pixels of three-level signals received from the comparator 503. The standard matrix patterns shown in FIG. 9 are used for detecting a screened halftone white pixel within an image, and in these matrix patterns a blank circle denotes a white pixel and a shaded circle denotes a black pixel.

With respect to each black pixel of the received image signals, a black bilevel pixel discrimination part 508 checks whether or not the pixel of the received image signal is an active black pixel that is judged as being an associated black pixel by the pattern matching part 504 and is judged as not being a screened halftone black pixel by the pattern matching part 506. Then, the black bilevel pixel discrimination part 508 detects whether or not the number of such active black pixels included in a pixel matrix with a prescribed size (for example, a 3×3 matrix) is greater than a predetermined reference value (for example, 2). If the number of the active pixels in the matrix is greater than the reference number, it is judged that the pixel in the center of the matrix is a black bilevel pixel which forms part of a line image such as a character. For example, if two or more active black pixels are included in a 3×3 pixel matrix, it is judged that the pixel in the center of the matrix is a black bilevel pixel.

Similarly, with respect to each black pixel of the received image signals, a white bilevel pixel discrimination part 509 checks whether or not the pixel of the received image signal is an active white pixel that is judged as being an associated white pixel by the pattern matching part 505 and is judged as not being a screened halftone white pixel by the pattern matching part 507. Then, the white bilevel pixel discrimination part 509 detects whether or not the number of such active white pixels included in a pixel matrix with a prescribed size (for example, a 3×3 matrix) is greater than a predetermined reference value (for example, 2). If the number of the active pixels in the matrix is greater than the reference number, it is judged that the pixel in the center of the matrix is a white bilevel pixel which forms part of a line image such as a character. For example, if two or more active white pixels are included in a 3×3 pixel matrix, it is judged that the pixel in the center of the matrix is a white bilevel pixel.

Based on the results of the detections by the black bilevel pixel discrimination part 508 and the white bilevel pixel discrimination part 509, if the number of black bilevel pixels in a matrix with a prescribed size (for example, a 5×5 matrix) is greater than a predetermined reference value (for example, 2) and the number of white bilevel pixels in the same matrix is greater than the reference value, it is judged that the pixel in the center of the matrix is a bilevel pixel which forms part of a line image such as a character. For example, if it is found that two or more black bilevel pixels and two or more white bilevel pixels coexist in a 5×5 pixel matrix, it is judged that the pixel in the center of the matrix is a bilevel pixel which forms part of a line image. An AND part 510 carries out this judgment with respect to each pixel of the received image signal as described above, but the discriminated bilevel pixel is limited to pixels on boundaries between a black area and a white area of a line image. In other words, the internal pixels of a line image cannot be detected by the AND part 510. A dilatation part 511 carries out a dilatation of the pixels of the received signals from the AND part 510, so that the internal pixels of a line image are also checked as to whether the pixels are bilevel pixels of a line image. Therefore, according to the present invention, it is possible to accurately discriminate a text region from an image, the text region including bilevel pixels on boundaries of a line image and the internal bilevel pixels of the line image. In the text region discrimination described above, a screened halftone pixel within the image is detected.

Figure 10:
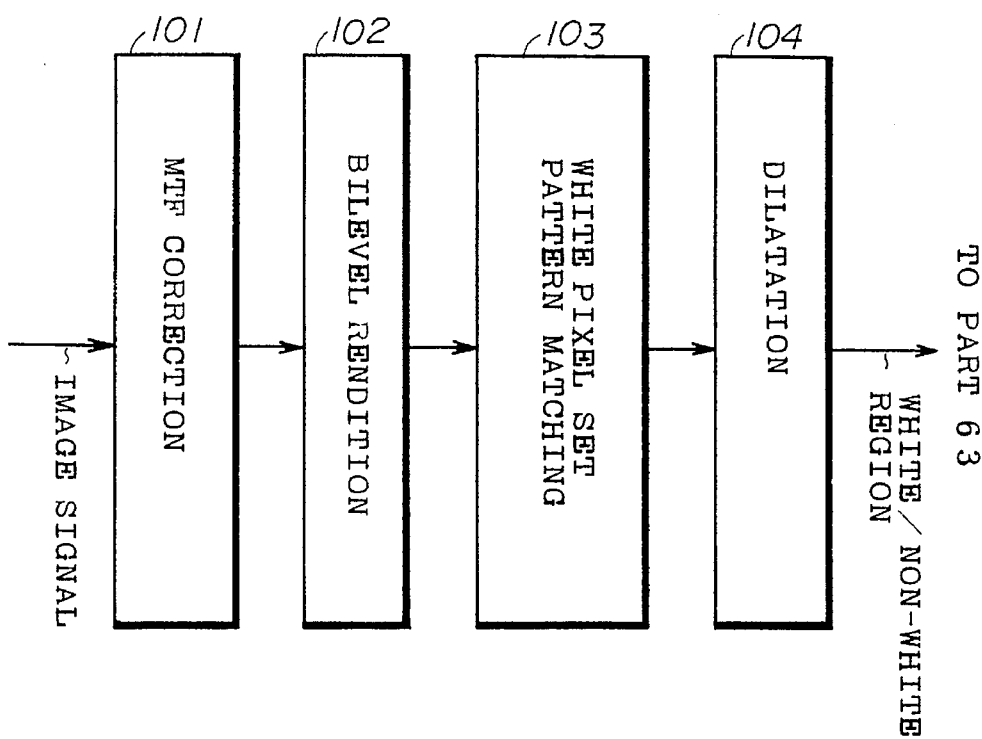
FIG. 10 is a block diagram showing a construction of a white region detecting unit.

FIG. 10 shows a construction of a white region detecting unit of the image region segmentation system according to the present invention. A white region refers to a region of an image in which a set of successive white pixels having a predetermined matrix size (for example, a 1×5 matrix size or a 5×1 matrix size) exists in the neighborhood of a subject pixel. The white region detecting unit 62 detects a white region within an image in the following manner. In FIG. 10, a MTF correction part 101 carries out a sharpening process of an image signal, a bilevel rendition part 102 carries out a bilevel image rendition process of an image signal from the MTF correction part 101 by comparing an intensity level of the image signal with a predetermined threshold level, and a white pixel set pattern matching part 103 receives a two-level signal indicating either a white pixel or a non-white pixel from the bilevel rendition part 102.

Figure 11:
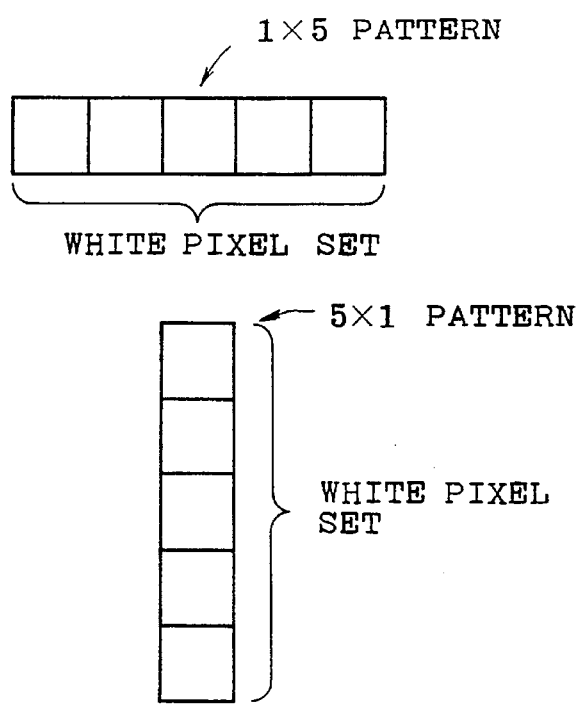
FIG. 11 is a diagram showing matrix patterns of a white pixel set including successive white pixels.

FIG. 11 shows matrix patterns of a white pixel set including successive white pixels. The matrix patterns are a 1×5 matrix pattern of five white pixels aligned in a horizontal direction and a 5×1 matrix pattern of five white pixels aligned in a vertical direction. The white pixel set pattern matching part 103 detects a white pixel set in the neighborhood of a subject pixel within an image by carrying out a pattern matching of a pixel matrix with the matrix patterns shown in FIG. 11. If a pixel matrix including a subject pixel in the center of the matrix matches with one of the matrix patterns shown in FIG. 11, the white pixel set pattern matching part 103 judges that the pixel in the center of the matrix is an active pixel. The matrix described above is, for example, a 5×5 pixel matrix. Based on the signals received from the pattern matching part 103, a dilatation part 104 checks the number of active pixels included the the above matrix having the detected pixel in the center of the matrix. If at least one active pixel is detected in the matrix, the dilatation part 104 judges that the matrix is a white region within an image, and generates a signal indicating that the pixel forms part of the white region within the image.

Figure 12:
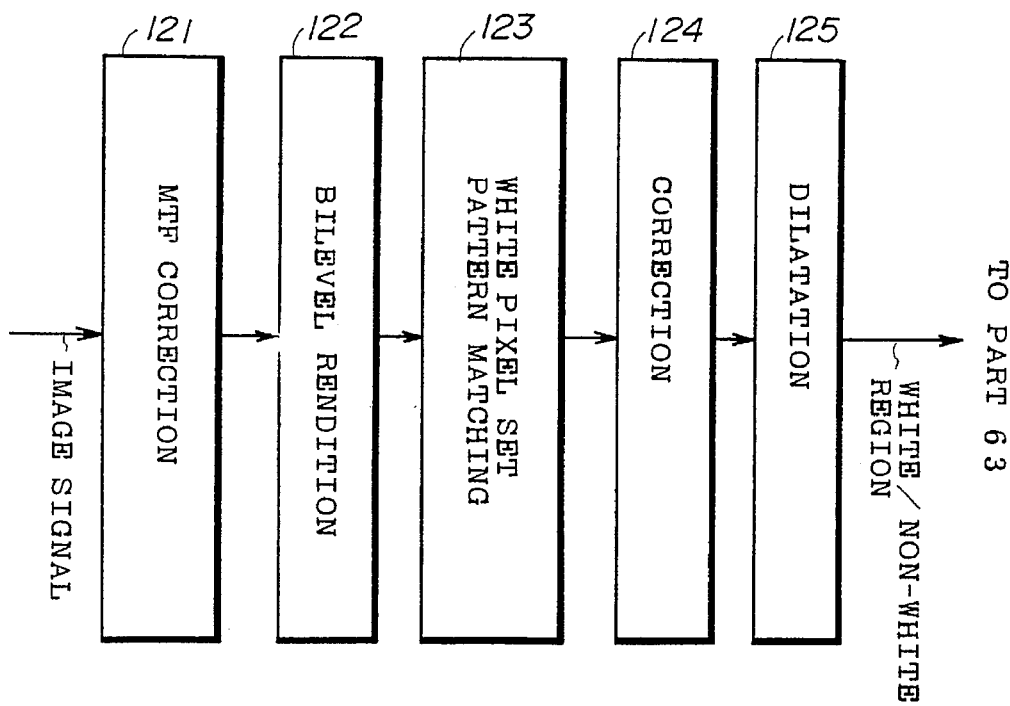
FIG. 12 is a block diagram showing a construction of another white region detecting unit.

FIG. 12 shows a construction of another white region detecting unit according to the present invention. In this white region detecting unit shown in FIG. 12, a correction part 124 is provided for improving the accuracy of text region detection, and the other parts are essentially the same as those corresponding parts of the white region detecting unit shown in FIG. 10.

Similarly to the above description, a white pixel set pattern matching part 123 shown in FIG. 12 detects a white pixel set in the neighborhood of a subject pixel within an image by carrying out a pattern matching with the matrix patterns shown in FIG. 11. If a pixel matrix including a subject pixel in the center of the matrix matches with one of the matrix patterns shown in FIG. 11, the white pixel set pattern matching part 123 judges tentatively that the pixel in the center of the matrix is an active pixel.

Figure 13:
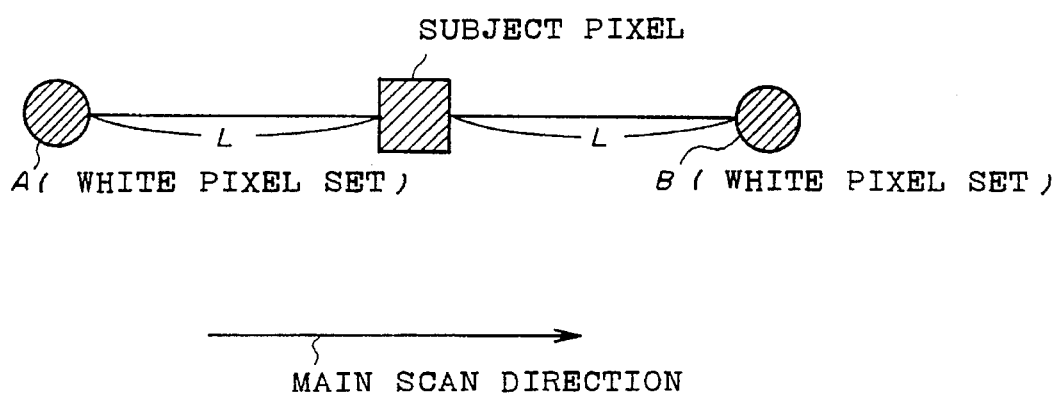
FIG. 13 is a diagram for explaining detection of a white pixel set located at a distance "L" from a subject pixel in both directions.

When a white pixel set is detected by the white pixel set pattern matching part 123, the correction part 124 either detects whether or not white pixel sets A and B exist along a main scan line within the image at a distance "L" from a subject pixel, or detects whether or not such white pixel sets exist in a given region within the image, as shown in FIG. 13. If it is detected that such white pixel sets A and B exist, the correction part 124 judges that the pixel in the center of the matrix is really an active pixel. FIG. 14 is a diagram for explaining the correction process performed by the correction part 124. As shown in FIG. 14, this correction technique utilizes a feature of a line image such as a character in which white regions as a white background of the character exist at symmetric positions both located at the same distance from a subject pixel in right and left directions. Therefore, it is possible to eliminate continuous halftone dots and screened halftone dots from an image so that a text region can accurately be discriminated from the image.

Based on the signals received from the correction part 124, a dilatation part 125 checks the number of active pixels included in the matrix. If at least one active pixel is detected in the matrix, the dilatation part 125 judges that the matrix is a white region within the image, and generates a signal indicating that a white region is detected in the neighborhood of the subject pixel within the image.

Accordingly, if the text region detecting unit 61 judges that the subject pixel forms a part of a text region and at the same time the white region detecting unit 62 judges that the white region is detected in the neighborhood of the subject pixel, the AND part 63 outputs a select signal indicating "one", which means that the subject pixel or the matrix including the pixel is a part of a text region. If it is judged that the subject pixel or the matrix including the pixel is not a part of a text region, the AND part 63 outputs a select signal indicating "zero". The image signal selection part 7 receives such a select signal from the segmentation unit 6. If a select signal indicating "one" is received, the image signal selection part 7 outputs a binary signal of a line image from the text image processing part 4. If a select signal indicating "zero" is received, the image signal selection part 7 outputs a signal of a picture image from the picture image processing part 5. Thus, when transmitting the image by a facsimile machine, it is possible that coding processes appropriate for characteristics of various regions of the image are carried out.

When the present invention is applied to a color image, the original color image is separated into three primary color signals of red, green and blue (RGB) or yellow, magenta and cyan (YMC) depending on the display format such as a cathode ray tube (CRT) display and a printing display of the reproduced image.

Further, the present invention is not limited to the above described embodiments, and variations and modifications may be made without departing from the scope of the present invention.

What is claimed is:

1. An image region segmentation system for discriminating a text region within an image, said system comprising:
    a) first detection means for detecting a candidate region for the text region within the image by outputting, for each pixel of the image included in the candidate region, a first signal indicating that said each pixel constitutes part of the candidate region for the text region;
    b) second detection means for detecting a white region including at least a group of successive white pixels within the image, by carrying out, for each of the pixels of the image, a pattern matching of:
        (i) a matrix of the pixels of the image including a reference pixel in the center of the matrix with
        (ii) predetermined matrix patterns, said second detection means including:
        1) means for detecting whether a white region including at least a group of successive white pixels exists within the image at a predetermined distance from the reference pixel along a scanning line, and
        2) means for supplying a second signal for each pixel of the image when the white region is detected to exist within the image at the predetermined distance from each said pixel; and
    c) discrimination means for detecting a text region within the image by determining that both the first signal and the second signal are simultaneously supplied by said first detection means and said second detection means with respect to each pixel of the image included in the detected text region.

2. A system as claimed in claim 1, wherein said first detection means detects a candidate region within the image by carrying out a pattern matching of a matrix of black and non-black pixels obtained from the image with predetermined standard matrix patterns for associated black pixels and by carrying out a pattern matching of a matrix of white and non-white pixels obtained from the image with predetermined standard matrix patterns for associated white pixels.

3. A system as claimed in claim 2, wherein said first detection means includes means for detecting whether or not a pixel of the image is an associated black pixel with respect to each pixel of the image by checking if a matrix including a detected pixel in the center of the matrix matches with a predetermined standard matrix pattern for associated black pixels, and means for detecting whether or not a pixel of the image is an associated white pixel with respect to each pixel of the image by checking if a matrix including the reference pixel in the center of the matrix matches with a predetermined standard matrix pattern for associated white pixels.

4. A system as claimed in claim 1, wherein said first detection means includes means for detecting whether or not the number of associated black pixels in a matrix including the reference pixel in the center of the matrix is greater than a given reference value, and means for detecting whether or not the number of associated white pixels in a matrix including the reference pixel in the center of the matrix is greater than a given reference value.

5. A system as claimed in claim 1, wherein said first detection means includes means for detecting whether or not associated black pixels the number of which is greater than a given reference value and associated white pixels the number of which is greater than a given reference value coexist within a matrix including the reference pixel in the center of the matrix.

6. A system as claimed in claim 1, wherein said first detection means includes means for detecting whether or not candidate pixels the number of which is greater than a given reference value are included in a pixel matrix including a pixel of a received image signal in the center of the matrix, said first detection means thus detecting that said pixel matrix is a candidate region if candidate pixels the number of which is greater than the reference value are included in said pixel matrix.

7. A system as claimed in claim 3, wherein said first detection means further includes means for detecting whether or not a pixel of the image is a screened black pixel with respect to each pixel of the image by checking if a matrix including the reference pixel in the center of the matrix matches with a predetermined standard matrix pattern for screened black pixels, and means for detecting whether or not a pixel of the image is a screened white pixel with respect to each pixel of the image by checking if a matrix including the reference pixel in the center of the matrix matches with a predetermined standard matrix pattern for screened white pixels.

8. A system as claimed in claim 7, wherein said first detection means further includes means for detecting whether or not the number of black pixels in a matrix including the reference pixel in the center of the matrix, which pixels are detected as being associated black pixels and detected as being non-screened black pixels, is greater than a given reference value, and means for detecting whether or not the number of white pixels in a matrix including the reference pixel in the center of the matrix, which pixels are detected as being associated white pixels and detected as being non-screened white pixels, is greater than a given reference number.

9. A system as claimed in claim 7, wherein said first detection means further includes means for detecting whether or not associated black pixels being detected as being non-screened black pixels the number of which is greater than a given reference value and associated white pixels being detected as being non-screened white pixels the number of which is greater than a given reference value coexist in a matrix including the reference pixel in the center of the matrix.

10. A system as claimed in claim 7, wherein said first detection means includes means for detecting whether or not candidate pixels the number of which is greater than a given reference value are included in a pixel matrix including a pixel of a received image signal in the center of the matrix, said first detection means thus detecting with respect to each pixel of the image that said pixel matrix is a candidate region if candidate pixels the number of which is greater than the reference value are included in said pixel matrix.

* * * * *

UNITED STATES PATENT AND TRADEMARK OFFICE
CERTIFICATE OF CORRECTION

PATENT NO. : 5,617,485
DATED : April 1, 1997
INVENTOR(S) : Satoshi Ohuchi and Kaoru Imao It is certified that error appears in the above-indentified patent and that said Letters Patent is hereby corrected as shown below:

Column 1, line 42, change "accurtely" to --accurately--.

Signed and Sealed this

Twenty-sixth Day of August, 1997

Attest:

BRUCE LEHMAN

Attesting Officer

Commissioner of Patents and Trademarks